Aug. 22, 1967  N. NICOLOFF  3,337,255
APPARATUS FOR RELEASABLY SUSPENDING OBJECTS UNDER WATER
Filed Aug. 30, 1965
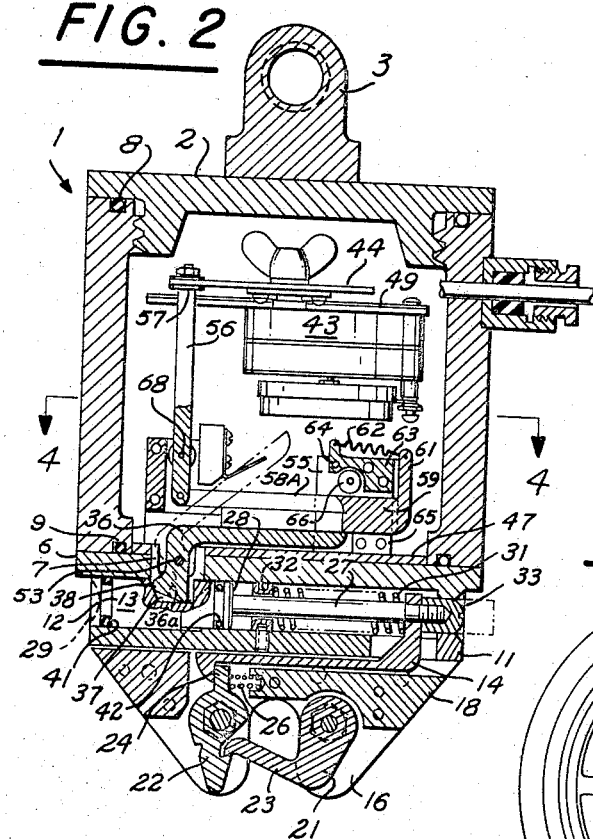
FIG. 2
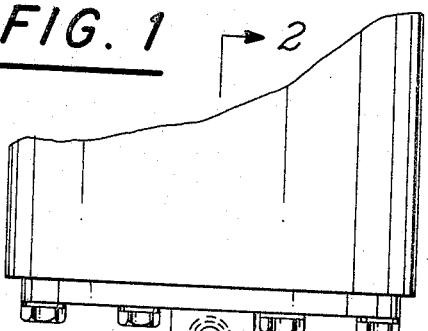
FIG. 1
FIG. 3
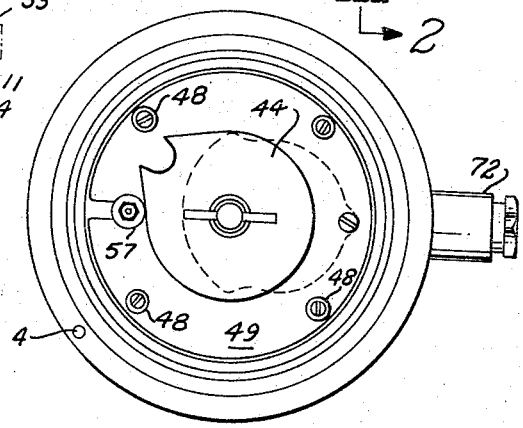
FIG. 5
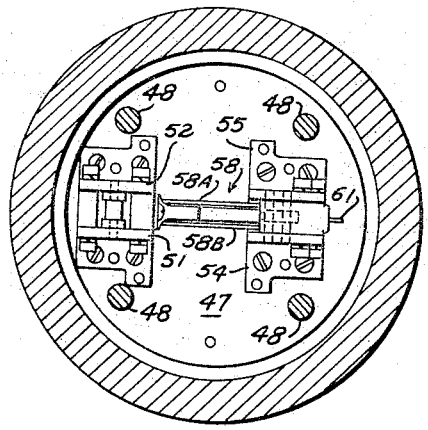
FIG. 4
INVENTOR.
NICHOLAS (NMI) NICOLOFF
BY
Paul D. Critchlow
ATTORNEYS

United States Patent Office 3,337,255
Patented Aug. 22, 1967

3,337,255
APPARATUS FOR RELEASABLY SUSPENDING OBJECTS UNDER WATER
Nicholas Nicoloff, San Diego, Calif., assignor to the United States of America as represented by the Secretary of the Navy
Filed Aug. 30, 1965, Ser. No. 483,892
8 Claims. (Cl. 294—66)

The invention described herein may be manufactured and used by or for the Government of the United States of America for governmental purposes without the payment of any royalties thereon or therefor.

The present invention relates to apparatus for releasably suspending submerged objects and, in particular, to controlled release mechanisms for such apparatus.

Underwater studies and explorations, such, for example, as are conducted in oceanographic or hydrographic work frequently require relatively large and heavy objects to be supported at fixed depths or for fixed periods of time after which the object is controllably released.

For example, oceanographic studies involve the use of plankton nets to collect plankton at particular ocean depths, and, in this work, a pair of release mechanisms may be employed. One of the mechanisms opens at the desired depth to release the mouth of the net, following which the net can be towed to collect the plankton. The second release mechanism then functions to close the net after a fixed interval of towing time.

It is known that a wide variety of release mechanisms have been developed and that a number of these contemplate underwater use. However, generally considered, these mechanisms do not appear appropriate or desirable for the uses contemplated by the present invention. Thus, those which are capable of supporting large and heavy objects such as the plankton nets, also require relatively large forces to accomplish the release. By way of illustration, explosively actuated bolts frequently are employed to secure the support so that the release requires the relatively high shearing force of the explosive. A further difficulty is that the release operation frequently is not adequately controlled to the extent that it can be set to operate after a fixed period of time or at a fixed depth.

It is therefore an object of the present invention to provide apparatus for suspendably supporting heavy objects under water, the apparatus being of such a nature that the release of the objects can be accomplished through the exertion of an unusually small force, such, for example, as a few ounces of pressure.

Another object is to provide apparatus in accordance with the foregoing object, the apparatus being essentially self-contained in a sealed casing so as to be capable of use at substantial depths.

A further object is to provide similar apparatus in which the release is mechanically accomplished through the use of a timing mechanism so as to permit the release operation at predetermined periods of time.

Yet another object is to provide an apparatus capable of remotely-controlled, mechanically-actuated release.

Still another object is to provide an apparatus which can mechanically release a heavy object in response to a predetermined water pressure or, in other words, at a fixed depth.

Further objects are to provide apparatus in accordance with the foregoing objects the apparatus being thoroughly reliable, relatively simple and inexpensive.

Other objects and their attendant advantages will become more apparent in the detailed description which is to follow.

Broadly considered, the objects of the invention are achieved by supporting the object on moveable jaws which are held in closed position by a locked piston, the piston being a differential surface area piston so that, when unlocked, the differential area of the piston permits sea pressure to supply the main force to operate the jaws. Preferably, the apparatus of the invention employs a system of levers and the unlocking of the levers may be accomplished either by a clock-driven cam mechanism or by a solenoid means, the latter being capable of remote control. If desired, a pressure switch may be included in the electrical power circuit to permit release at a predetermined water pressure.

The invention is illustrated in the accompanying drawing of which:

FIG. 1 is a fragmentary side elevation showing the lower portion of the present release apparatus;

FIG. 2 is a sectional view taken essentially along line 2—2 of FIG. 1 but with certain elements or portions thereof being shown as side elevation;

FIG. 3 is a plan view of the apparatus with its cap portion removed;

FIG. 4 is a section along lines 4—4 of FIG. 2; and

FIG. 5 is another fragmentary view illustrating in partial sections a modified form of the invention.

Referring to FIGS. 1 and 2, the major structural parts of the apparatus include a cylindrical casing 1 having a cap or lid 2 threaded into the upper portion of the casing side walls, this cap being provided with an eye bolt 3 by which the apparatus may be suspended by a cable or the like. Preferably, a wing nut 5 (FIG. 5) is employed to secure the threaded engagement of the cap to the cylinder side walls this wing nut being received in a threaded opening 4 shown in FIG. 3.

Casing 1 also includes a bottom wall 6 bolted to its side walls and, for reasons which will be explained, bottom wall 6 is provided with an opening 7. Further, since the casing is adapted to receive certain operative parts of the release mechanism it is desirable that it be sealed against ingress of water and, to assist in this purpose, the bottom and top walls both are in sealed engagement with side walls, the seals being provided by the O-rings 8 and 9.

Bottom wall 6 further has an integral downwardly-extending flange portion 11 (FIG. 1), this portion being provided with transverse opening 12 so as to provide a cylinder in which is mounted a specially-formed piston member 13. At its right end (FIG. 2) the piston carries a jaw-latching arm 14.

To mount the object-supporting jaws of the apparatus, the lower end of integral flange 11 is bifurcated (FIG. 1) and a pair of downwardly extending flanges 16 and 17 are threadably secured to the bifurcations. Flanges 16 and 17 also support a latch arm guide plate 18 (FIG. 2) upon which latch arm 14 rests.

Jaws 21 and 22 are pivotally mounted between flanges 16 and 17 and, as shown, jaw 21 has a laterally extending arm or hook portion 23 adapted to engage a notch formed in jaw 22 when the jaws are in a close position. Also, the upper part of jaw 22 has an upwardly-extending flange portion 24 engaged by jaw-latching arm 14, this portion further being engaged by a spring member 26 which bears at its other end against guide plate 18. Spring 26 urges jaw 22 into engagement with the latch and the arrangement is such that when latch arm 14 moves to the right (FIG. 2) spring 26 is compressed and the pivots to release jaw 21 and permit the release of the load.

Other principal features of the present invention include the form and functioning of piston 13, as well as a system of levers mounted within casing 1 to hold piston 13 in a fixed position until such time as it is desired to release the load. As will be noted, piston 13 is an elongate member extending throughout the length of its cylinder bore so that both ends are exposed to the pressure of the surrounding water medium. Also, as already stated, piston 13 is a differential surface area piston in that its left hand end (FIG. 2) is formed with a greater surface area that the right hand portion. More specifically, the right hand end of piston 13 is reduced in size to provide a shaft portion 27 and this reduction provides a circular flange section 28 against which water pressure acting on the right hand side of the piston is exerted. The left hand end of the piston, however, has an outer surface 29 which is considerably larger than flange 28 so that, when the piston is released, the differential pressure causes it to reciprocate to the right (FIG. 2). Normally, the piston is urged toward the left by a spring 31, this spring being compressed between a stop member 32 and a latch arm 14. As may be noted, latch arm 14 is held in position by a nut 33 mounted on the end of piston shaft portion 27, the nut pressing the latch arm against a flange of the shaft. The strength of spring 31 may be selected to permit movement of the piston to the right under the influence of the differential pressure.

Normally, piston 13 is held in a fixed position by a piston-engaging latch arm 36 pivotally mounted in casing 1 in a manner to be described, this arm being shaped so as to provide a flange portion 36a projecting downwardly through opening 7 of the casing. Portion 36a is received in a notched out portion 37 of piston 13 and this notch is formed with an inclined wall 38 upon which a rounded toe of the piston-engaging latch portion rides when the piston moves to the right, as the piston moves latch arm 36 pivots into the dotted line position shown in FIG. 2. To effectively seal the casing O-ring members 41 and 42 are mounted one on each side of notch 37.

Mounted interiorly of casing 1 is a system of levers, the principal function of which is to hold latch arm 36 in a piston-locking position until release of the load is desired. In the FIG. 2 modification, release is accomplished mechanically by means of a clock mechanism 43 which drives a cam 44 the shape of the cam being illustrated in FIG. 3. To support the cam and the clock as well as other internal structure, lower wall 6 of casing 1 supports a circular plate 47 which, by means of four posts 48 (FIGS. 3 and 4) supports both the clock mechanism and the cam.

Also bolted to lower plate 47 is a pair of L-shaped flanges 51 and 52 (FIG. 4) serving both to support the lever system and to provide a journal for a shaft 53 upon which jaw-latching arm 36 is pivoted. As will be noted, flanges 51 and 52 have downwardly extending portions projecting through plate 47 and casing lower wall 6 to provide journals for shaft 53. Another pair of L-shaped flanges 54 and 55, also bolted to circular plate 47, provide support for other members to be described.

The lever system includes a lever or rocker arm 56 the upper end of which is provided with a cam-follower 57 adapted to ride cam 44, while the lower end is pinned to a latch locking arm 58.

Latch locking arm 58 is of a yoke type having spaced portions 58a and 58b and at its right hand end (FIG. 2) a cross piece 59 the lower edge of which engages the upper edge of latch arm 36 so as to normally hold this latch arm in a locked position. Cross-piece 59 rides on small plate 65 carried between flanges 54 and 55. Also, the extreme end of arm 58 has an upwardly extending narrow flange 61 (FIG. 2) mounting a spring 62 that urges latch arm 56 to resiliently return the arm to its normal position. Also the spring holds cam-follower 57 against its cam. A block 63 pinned on shaft 64 carried by flanges 54 and 55 secures the inner end of spring 62 and this block is formed with a bearing surface engaging a bearing 66 also carried by flanges 54 and 55.

A further feature of the invention is that lever arm 56 is pivotally or rockably mounted near its lower end on a shaft 68 so that when the upper end of arm 56 to the left (FIG. 2), the lower end moves to the right against the tension of spring 62. The arrangement is such that the movement is sufficient to disengage cross piece 59 from latch arm 36 and permit the latch arm to free piston 13.

Piston 13 then moves to the right (FIG. 2) under the differential pressure already discussed causing the latch arm 36 to pivot upwardly into its dotted line position. Latch arm 36 is capable of swinging to its upward position since it is free to move in between the yoke arms of hold-down arm 58. As probably is apparent, the only force causing the latch arm 36 to pivot is the movement of piston 13. As piston 13 moves to the right (FIG. 2) it compresses spring 31 and also carries arm 14 to the right to pivotally rotate jaw 22 and release the load. The apparatus easily can be reset after release by again engaging cross piece 59 of hold-down arm 58 with the outer edge of latch arm 36. As will be appreciated from inspection of the cam shape of FIG. 3, the initial release movement of lever arm 56 is produced when its cam follower rides over the largest portion of the cam.

The principal advantages of the present apparatus are its ability to hold heavy loads and at the same time permit their release in response to the exertion of only a few ounces of pressure. This feature is achieved first by employing the differential pressure of sea water to produce the load releasing movement of piston 13. In addition, the mechanical advantage obtained by the leverage of such members as lever arm 56 minimizes the force necessary to initiate the load releasing action. Since the casing itself can be tightly sealed, mechanisms such as clock 43 can be employed. Other apparent advantages are that the apparatus is thoroughly reliable since it is formed of sturdy, mechanical parts requiring little maintenance or replacement.

FIG. 5 illustrates another embodiment of the invention which has essentially the same advantages as the embodiment of the previously described modification. As has been noted, FIG. 5 is only a fragmentary view similar in section to FIG. 2. The portions of FIG. 5 which are not shown are precisely the same as those illustrated in FIGS. 1 and 2. In fact, the only significant difference in the two modifications is that the clock and cam mechanism of FIG. 2 is replaced by a solenoid actuation of lever 56. To achieve the solenoid actuation, a suitable electrical power carrying cable 71 is admitted to the interior of casing 1 through an appropriate bushing member 72 and, if desired, the cable may be run to a surface location to permit remote control. The movable arm 73 of the solenoid is, as usual, mounted within solenoid coils which when energized cause arm 73 to move to the left. A spring 75 induces a return movement. The movement of arm 73 then moves lever arm 56 to the left in the manner already described with reference to the clock driven cam of FIG. 2. The load releasing operation is accomplished in precisely the same manner as that which has previously been described.

A further refinement premitting another type of control is in the use of a pressure-responsive switch member 74 which may be any commercially-obtainable type. Its function is to induce the load release when the apparatus has reached a particular depth or, in other words, is subjected to a particular water pressure. When the operation is under the control of the pressure responsive switch, the load release obviously is automatically accomplished without need for any manual control by the operator. In the previously-mentioned plankton net use of the apparatus one of the release mechanisms would be pressure controlled while the other could be a clock-time operation. In this regard it can be noted that the clock mechanism can be easily removed and the solenoid substituted in its place. However in this event, plate 76 which supports the solenoid would have to be modified to the extent that it is supported at a lower level on the previously mentioned posts 48. Thus, a further advantage lies in the versatility of the apparatus which permits it to be used in a variety of ways.

Obviously many modifications and variations of the present invention are possible in the light of the above teachings. It is therefore to be understood that within the scope of the appended claims the invention may be practiced otherwise than as specifically described.

What is claimed is:

1. Apparatus for releasably suspending an object under water comprising:
   a casing
   cylinder means carried by the casing,
   piston means mounted in said cylinder and having spaced portions exposed to said water medium,
   one of said spaced exposed portions having a greater surface area than the other whereby differential water pressure produces piston reciprocation,
   a pair of object-supporting jaws,
   an arm carried by and reciprocable with said piston,
   said arm operatively engaging at least one of said jaws for opening the jaws and releasing said object in response to piston reciprocation,
   means for holding said piston in a fixed position against said differential pressure, and
   means for releasing said holding means.

2. The apparatus of claim 1 wherein said piston holding means includes:
   a latch arm engaged with the piston,
   lever means normally maintaining said latch arm engagement, and
   a cam engaging said lever means.

3. The apparatus of claim 2 wherein said means for releasing said holding means is a clock mechanism:
   said clock mechanism drivably engaging said cam and said cam being shaped for actuating said lever means at a predetermined interval of time.

4. The apparatus of claim 3 wherein said casing is fluid sealed and said lever means, piston holding means and clock mechanism are mounted in the sealed casing.

5. The apparatus of claim 2 wherein said means for releasing said holding means includes:
   an electrical power circuit,
   a solenoid mechanism coupled into said circuit,
   said solenoid mechanism engaging said lever means for mechanically actuating the lever means upon energization.

6. The apparatus of claim 5 further including a pressure sensitive switch coupled into said power circuit for engaging said solenoid mechanism in response to a predetermined water pressure.

7. Apparatus for releasably suspending an object underwater comprising:
   a casing having a side wall and top and bottom walls sealably engaging said side wall,
   transverse cylinder means carried by said bottom wall,
   piston means reciprocally mounted in said cylinder means,
   said piston means having one of its end surface areas exposed to said water medium and also having a section of its other end reduced in size to provide a shaft portion, said reduction also providing a water-exposed flange having a smaller surface area than that of said exposed end whereby differential water pressure produces piston recirporcation,
   the portion of said piston between said exposed surface areas being formed with a notch,
   piston sealing means mounted on either side of said notch interiorally of said exposed surface areas,
   a pair of pivotally mounted object-supporting jaws carried by and disposed adjacent to said cylinder means,
   an arm carried by and reciprocable with said piston,
   said arm operatively engaging one of said jaws for pivotally opening the jaws and releasing said object in response to piston reciprocation,
   means engaged in said piston notch for releasably holding the piston in a fixed position against said differential water pressure.

8. The apparatus of claim 7 wherein said casing bottom wall is formed with an opening and said piston-holding means includes:
   a pivotal arm projecting through said bottom wall opening into said notch engagement,
   a yoke-type arm having one of its ends normally engaging said pivotal arm for holding it in a fixed piston engaging position,
   a lever arm having one of its ends linked to the other end of said yoke-type arm for reciprocably moving said yoke-type arm out of engagement with said pivotal arm, whereupon said pivotal arm can pivot and said piston reciprocate in response to said differential pressure,
   said lever arm being pivotally mounted medially of its end portion, and
   means for mechanically pivoting said lever arm for initiating said piston release action.

References Cited
UNITED STATES PATENTS

| | | | |
|---|---|---|---|
| 3,228,332 | 1/1966 | Snyder | 294—83 X |
| 3,245,346 | 4/1966 | Schuetzler | 102—7 |
| 3,262,173 | 7/1966 | Pickens | 294—66 X |

GERALD M. FORLENZA, *Primary Examiner.*

GEORGE F. ABRAHAM, *Examiner.*